US009838363B2

(12) United States Patent
Sun et al.

(10) Patent No.: US 9,838,363 B2
(45) Date of Patent: *Dec. 5, 2017

(54) AUTHENTICATION AND INITIAL KEY EXCHANGE IN ETHERNET PASSIVE OPTICAL NETWORK OVER COAXIAL NETWORK

(71) Applicant: Futurewei Technologies, Inc., Plano, TX (US)

(72) Inventors: Yanbin Sun, Shenzhen (CN); Guangsheng Wu, Shenzhen (CN); Li Zhang, Wuhan (CN); Jim Chen, Corona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/995,981

(22) Filed: Jan. 14, 2016

(65) Prior Publication Data

US 2016/0134600 A1 May 12, 2016

Related U.S. Application Data

(63) Continuation of application No. 14/243,387, filed on Apr. 2, 2014, now Pat. No. 9,270,651.

(Continued)

(51) Int. Cl.
*H04L 29/06* (2006.01)
*H04L 9/08* (2006.01)
*H04B 10/272* (2013.01)

(52) U.S. Cl.
CPC ....... *H04L 63/0471* (2013.01); *H04B 10/272* (2013.01); *H04L 9/0858* (2013.01);
(Continued)

(58) Field of Classification Search
CPC . H04L 63/0471; H04L 9/0858; H04L 63/061; H04L 63/062; H04L 63/068; H04L 9/0891; H04L 2463/062; H04B 10/272
See application file for complete search history.

(56) References Cited

U.S. PATENT DOCUMENTS

2005/0113024 A1 5/2005 Capece et al.
2005/0135609 A1* 6/2005 Lee ...................... H04L 9/0825
380/30

(Continued)

FOREIGN PATENT DOCUMENTS

CN 101388818 A 3/2009
CN 101715099 A 5/2010
(Continued)

OTHER PUBLICATIONS

Schaad, J., "Advanced Encryption Standard (AES) Key Wrap Algorithm", RFC 3394, Sep. 2002, 41 pages.

(Continued)

*Primary Examiner* — Eleni Shiferaw
*Assistant Examiner* — Mary Li
(74) *Attorney, Agent, or Firm* — Conley Rose, P.C.

(57) ABSTRACT

A method comprising generating an updated security key upon expiration of a key exchange timer, transferring the updated security key to a Coaxial Network Unit (CNU), retaining an original key, wherein the updated security key comprises a different key identification number than the original key, accepting and decrypting upstream traffic that employs either the original key or the updated key, after transferring the updated security key to the CNU, creating a key switchover timer, before the key switchover timer expires, verify that upstream traffic transferred from the CNU on a logical link uses the updated security key, and when upstream traffic is encrypted using the updated secu- (Continued)

rity key, begin using the updated security key to encrypt downstream traffic and clear the key switchover timer.

19 Claims, 9 Drawing Sheets

Related U.S. Application Data

(60) Provisional application No. 61/809,162, filed on Apr. 5, 2013, provisional application No. 61/823,506, filed on May 15, 2013.

(52) U.S. Cl.
CPC .......... *H04L 9/0891* (2013.01); *H04L 63/061* (2013.01); *H04L 63/062* (2013.01); *H04L 63/068* (2013.01); *H04L 2463/062* (2013.01)

(56) References Cited

U.S. PATENT DOCUMENTS

| | | | |
|---|---|---|---|
| 2005/0201564 A1 | 9/2005 | Kayashima et al. | |
| 2008/0247550 A1* | 10/2008 | Kozaki | H04L 9/12 380/278 |
| 2011/0004760 A1 | 1/2011 | Sharaga et al. | |
| 2011/0058813 A1* | 3/2011 | Boyd | H04L 12/413 398/68 |
| 2011/0078755 A1 | 3/2011 | Dai | |
| 2011/0317834 A1* | 12/2011 | Chaturvedi | H04L 63/061 380/255 |

FOREIGN PATENT DOCUMENTS

| | | |
|---|---|---|
| CN | 102158992 A | 8/2011 |
| CN | 102549952 A | 7/2012 |
| CN | 102577181 A | 7/2012 |
| EP | 1534027 A2 | 5/2005 |
| EP | 1746760 A1 | 1/2007 |
| WO | 2011031831 A1 | 3/2011 |

OTHER PUBLICATIONS

Song, et al., "The AES-CMAC Algorithm", RFC 4493, Jun. 2006, 20 pages.
"IEEE Standard for Local and Metropolitan Area Networks—Media Access Control (MAC) Security", IEEE Standard 802.1AE-2006, Aug. 18, 2006, 154 pages.
"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks", IEEE Standard 802.3ah, Sep. 7, 2004, 640 pages.
"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks", IEEE Standard 802.3av, Oct. 30, 2009, 236 pages.
"IEEE Standard for Local and Metropolitan Area Networks—Port Based Network Access Control", IEEE Standard 802.1X-2004, Dec. 13, 2004, 179 pages.
"IEEE Standard for Information Technology—Telecommunications and Information Exchange Between Systems—Local and Metropolitan Area Networks—Specific Requirements, Part 11: Wireless LAN and Medium Access Control (MAC) and Physical Layer (PHY) Specifications", IEEE Standard 802.11-2007, Jun. 12, 2007, 1232 pages.
"DOCSIS Provisioning of EPON Specifications—DPoE IP Network Element Requirements", DPoE-SP-IPNEv1.0-106-130808, Aug. 8, 2013, 98 pages.
Foreign Communication From a Counterpart Application, PCT Application No. PCT/CN2014/074907, International Search Report dated Jul. 22, 2014, 7 pages.
Foreign Communication From a Counterpart Application, PCT Application No. PCT/CN2014/074907, Written Opinion dated Jul. 22, 2014, 5 pages.
Notice of Allowance dated Oct. 15, 2015, 10 pages, U.S. Appl. No. 14/243,387, filed Apr. 2, 2014.
Office Action dated May 21, 2015, 7 pages, U.S. Appl. No. 14/243,387, filed Apr. 2, 2014.
Office Action dated Jun. 24, 2015, 32 pages, U.S. Appl. No. 14/243,387, filed Apr. 2, 2014.
"Series G: Transmission Systems and Media Digital Systems and Networks, Digital Sections and digital line system—Optical Line system for local and access networks," ITU-T, G.987.3, Oct. 2010, 134 pages.
Foreign Communication From a Counterpart Application, European Application No. 14780022.1, Extended European Search Report dated Apr. 14, 2016, 8 pages.
"Series G: Transmission Systems and Media, Digital Systems and Networks, Digital Sections and Digital Line System—Optical Line Systems for Local and Access Networks, Broadband Optical Access Systems Based on Passive Optical Networks (PON)", ITU-T Recommendation G.983.1, Jan. 2005, 124 pages.
"Series G: Transmission Systems and Media, Digital Systems and Networks, Digital Sections and Digital Line System—Optical Line Systems for Local and Access Networks, Broadband Optical Access Systems Based on Passive Optical Networks (PON), Amendment 1: PICS for OLT and ONU", ITU-T Recommendation G.983.1 Amendment 1, May 2005, 60 pages.
"Series G: Transmission Systems and Media, Digital Systems and Networks, Digital Sections and Digital Line System—Optical Line Systems for Local and Access Networks, Broadband Optical Access Systems Based on Passive Optical Networks (PON)", ITUT-T Recommendation G.9811 Erratum 1, Mar. 2006, 1 page.
"Series G: Transmission Systems and Media, Digital Systems and Networks, Digital Sections and Digital Line System—Optical Line Systems for Local and Access Networks, ONT Management and Control Interface Specification for B-PON", ITU-T Recommendation G.983.2, Jul. 2005, 370 pages.
"Series G: Transmission Systems and Media, Digital Systems and Networks, Digital Sections and Digital Line System—Optical Line Systems for Local and Access Networks, ONT Management and Control Interface Specification for B-PON, Amendment 1: Omnibus Improvements for OMCI", ITU-T Recommendation G.983.2 Amendment 1, Mar. 2006, 198 pages.
"Series G: Transmission Systems and Media, Digital Systems and Networks, Digital Sections and Digital Line System—Optical Line Systems for Local and Access Networks, ONT Management and Control Interface Specification for B-PON, Amendment 2", ITU-T Recommendation G.983.2 Amendment 2, Jan. 2007, 64 pages.
"Series G: Transmission Systems and Media, Digital Systems and Networks, Digital Sections and Digital Line System—Optical Line Systems for Local and Access Networks, ONT Management and Control Interface Specification for B-PON, Erratum 1", ITU-T Recommendation G.983.2 Erratum 1, Jun. 2006, 1 page.
"Series G: Transmission Systems and Media, Digital Systems and Networks, Digital Sections and Digital Line System—Optical Line Systems for Local and Access Networks, A Broadband Optical Access System with Increased Service capability by Wavelength Allocation", ITU-T Recommendation G.9813, Mar. 2001, 59 pages.
"Series G: Transmission Systems and Media, Digital Systems and Networks, Digital Sections and Digital Line System—Optical Line Systems for Local and Access Networks, A Broadband Optical Access System with Increased Service capability Using Dynamic Bandwidth Assignment", ITU-T Recommendation G.983.4, Nov. 2001, 92 pages.

(56) References Cited

OTHER PUBLICATIONS

"Series G: Transmission Systems and Media, Digital Systems and Networks, Digital Sections and Digital Line System—Optical Line Systems for Local and Access Networks, A Broadband Optical Access System with Increased Service capability Using Dynamic Bandwidth Assignment, Amendment 1: New Annex A—Performance Monitoring Parameters", ITU-T Recommendation G.983.4 Amendment 1, Dec. 2003, 12 pages.
Series G: Transmission Systems and Media, Digital Systems and Networks, Digital Sections and Digital Line System—Optical Line Systems for Local and Access Networks, A Broadband Optical Access System with Increased Service capability Using Dynamic Bandwidth Assignment, G.983.4, Corrigendum 1, Jan. 2005, 8 pages.
"Series G: Transmission Systems and Media, Digital Systems and Networks, Digital Sections and Digital Line System—Optical Line Systems for Local and Access Networks, A Broadband Optical Access System with Enhanced Survivability", ITU-T Recommendation G.983.5, Jan. 2002, 60 pages.
"Series G: Transmission Systems and Media, Digital Systems and Networks, Digital Sections and Digital Line System—Optical Line Systems for Local and Access Networks, ONT Management and Control Interface Specifications for—Pon System with Protection Features", ITU-T Recommendation G.983.6, Jun. 2002, 22 pages.
"Series G: Transmission Systems and Media, Digital Systems and Networks, Digital Sections and Digital Line System—Optical Line Systems for Local and Access Networks, Gigabit-capable Passive Optical Networks (GPON): General Characteristics", ITU-T Recommendation G.984.1, Mar. 2008, 43 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer Specification", ITU-T Recommendation G.984.2, Mar. 2003, 38 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer Specification, Amendment 1: New Appendix III—Industry Best Practice for 2.488 Gbit/s Downstream, 1.244 Gbit/s Upstream G-PON", ITU-T Recommendation G.984.2 Amendment 1, Feb. 2006, 12 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer Specification, Amendment 2", ITU-T Recommendation G.984.2 Amendment 2, Mar. 2008, 16 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification", ITU-T Recommendation G.984.3, Mar. 2008, 146 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 1—Specification of the ONU Registration Method and Various Clarifications", ITU-T Recommendation G.984.3 Amendment 1, Feb. 2009, 16 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 2: Time-of-Day Distribution and Maintenance Updates and Clarifications", ITU-T Recommendation G.984.3 Amendment 2, Nov. 2009, 18 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 3", ITU-T Recommendation G.984.3 Amendment 3, Apr. 2012, 18 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Erratum 1", ITU-T Recommendation G.984.3, Erratum 1, Apr. 2010, 1 page.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification", ITU-T Recommendation 984.4, Feb. 2008, 430 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 1", ITU-T Recommendation G.984.4 Amendment 1, Jun. 2009, 92 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Erratum 1", ITU-T Recommendation G.984.4 Erratum 1, Aug. 2009, 2 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 2: Changes and Extensions to the OMCI, Editorial clarifications and Corrections", ITU-T Recommendation G.984.4 Amendment 2, Nov. 2009, 164 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 3: Clarification of Scope of Application", ITU-T Recommendation G984.4 Amendment 3, Jul. 2010, 10 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Corrigendum 1", ITU-T Recommendation G.984.4, Corrigendum 1, Mar. 2010, 8 pages.
"Series G: Transmission Systems and Media, Digital Systems and Networks, Digital Sections and Digital Line System—Optical Line Systems for Local and Access Networks, Gigabit-capable Passive Optical Networks (G-PON): Enhancement Band", ITU-T Recommendation G.984.5, Sep. 2007, 22 pages.
"Series G: Transmission Systems and Media, Digital Systems and Networks, Digital Sections and Digital Line System—Optical Line Systems for Local and Access Networks, Gigabit-capable Passive Optical Networks (G-PON): Enhancement Band, Amendment 1", ITU-T Recommendation G.984.5 Amendment 1, Oct. 2009, 12 pages.
"Series G: Transmission Systems and Media, Digital Systems and Networks, Digital Sections and Digital Line System—Optical Line Systems for Local and Access Networks, Gigabit-capable Passive Optical Networks (G-PON): Reach Extension", ITU-T Recommendation G.984.6, Mar. 2008, 40 pages.
"Series G: Transmission Systems and Media, Digital Systems and Networks, Digital Sections and Digital Line System—Optical Line Systems for Local and Access Networks, Gigabit-capable Passive Optical Networks (G-PON): Reach Extension, Amendment 1: Wavelength-converting, Continuous Mode, and 1:N-protected Range Extenders", ITU-T Recommendation G.984.6 Amendment 1, Nov. 2009, 28 pages.

(56) References Cited

OTHER PUBLICATIONS

"Series G: Transmission Systems and Media, Digital Systems and Networks, Digital Sections and Digital Line System—Optical Line Systems for Local and Access Networks, Gigabit-capable Passive Optical Networks (G-PON): Reach Extension, Amendment 2", ITU-T Recommendation G.984.6 Amendment 2, May 2012, 16 pages.

"Series G: Transmission Systems and Media, Digital Systems and Networks, Digital Sections and Digital Line System—Optical Line Systems for Local and Access Networks, Gigabit-capable Passive Optical Networks (G-PON): Long Reach", ITU-T Recommendation G.984.7, Jul. 2010, 14 pages.

"Series X: Data Networks, Open System Communications and Security, Directory, Information Technology—Open Systems Interconnection—The Directory: Public-Key and Attribute Certificate Frameworks", ITU-T Recommendation X.509, Oct. 2012, 208 pages.

Machine Translation and Abstract of Chinese Publication No. CN102158992, Aug. 17, 2011, 25 pages.

Vlachine Translation and Abstract of Chinese Publication No. CN102549952, Jul. 4, 2012, 11 pages.

Foreign Communication From a Counterpart Application, Chinese Application No. 201480010330.7, Chinese Office Action dated May 22, 2017, 4 pages.

Foreign Communication From a Counterpart Application, Chinese Application No. 201480010330.7, Chinese Search Report dated May 12, 2017, 2 pages.

\* cited by examiner

AUTHENTICATION AND INITIAL KEY EXCHANGE IN ETHERNET PASSIVE OPTICAL NETWORK OVER COAXIAL NETWORK

CROSS-REFERENCE TO RELATED APPLICATIONS

The present application is a continuation application of U.S. patent application Ser. No. 14/243,387, filed Apr. 2, 2014 by Yanbin Sun, et al., and entitled "Authentication and Initial Key Exchange in Ethernet Passive Optical Network Over Coaxial Network", which claims priority to U.S. Provisional Patent Application 61/809,162, filed Apr. 5, 2013 by Yanbin Sun, et al., and entitled "Method and Apparatus for Authentication and Initial Key Exchange in an Ethernet Passive Optical Network Protocol over Coax" and U.S. Provisional Patent Application 61/823,506, filed May 15, 2013 by Yanbin Sun, et al., and entitled "Method and Apparatus for Authentication and Initial Key Exchange in an Ethernet Passive Optical Network Protocol over Coax", all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Passive Optical Network (PON) is one system for providing core network access to end users. A PON may be a Point-to-Multipoint (P2MP) network with passive splitters positioned in an Optical Distribution Network (ODN) to enable a single feeding fiber from a central office to serve multiple customer premises. PON may employ different wavelengths for upstream and downstream transmissions. Ethernet PON (EPON) is a PON standard developed by the Institute of Electrical and Electronics Engineers (IEEE) and specified in IEEE documents 802.3ah and 802.3av, both of which are incorporated herein by reference. Hybrid access networks employing both EPON and other network types have attracted growing attention.

SUMMARY

In one embodiment, the disclosure includes a Fiber Coaxial Unit (FCU) comprising an optical interface configured to couple to an Optical Line Terminal (OLT) via a PON, a processor coupled to the optical interface, an electrical interface coupled to the processor and configured to couple to the Coaxial Network Unit (CNU) via an Ethernet PON over coaxial (EPoC) network, and forward a plurality of encrypted security keys to the CNU via the EPoC.

In another embodiment, the disclosure includes an OLT comprising a receiver coupled to a PON and configured to receive a security key request from an FCU via the PON, a processor coupled to the receiver and configured to generate a first security key responsive to the security key request from the FCU, and encrypt the first security key in a security key response message, and a transmitter coupled to the processor and configured to transmit the security key response message comprising the encrypted first security key to the FCU via the PON.

In another embodiment, the disclosure includes a method comprising generating an updated security key upon expiration of a key exchange timer, transferring the updated security key to a CNU, retaining an original key, wherein the updated security key comprises a different key identification number than the original key, accepting and decrypting upstream traffic that employs either the original key or the updated key, after transferring the updated security key to the CNU, creating a key switchover timer, before the key switchover timer expires, verify that upstream traffic transferred from the CNU on a logical link uses the updated security key, and when upstream traffic is encrypted using the updated security key, begin using the updated security key to encrypt downstream traffic and clear the key switchover timer.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
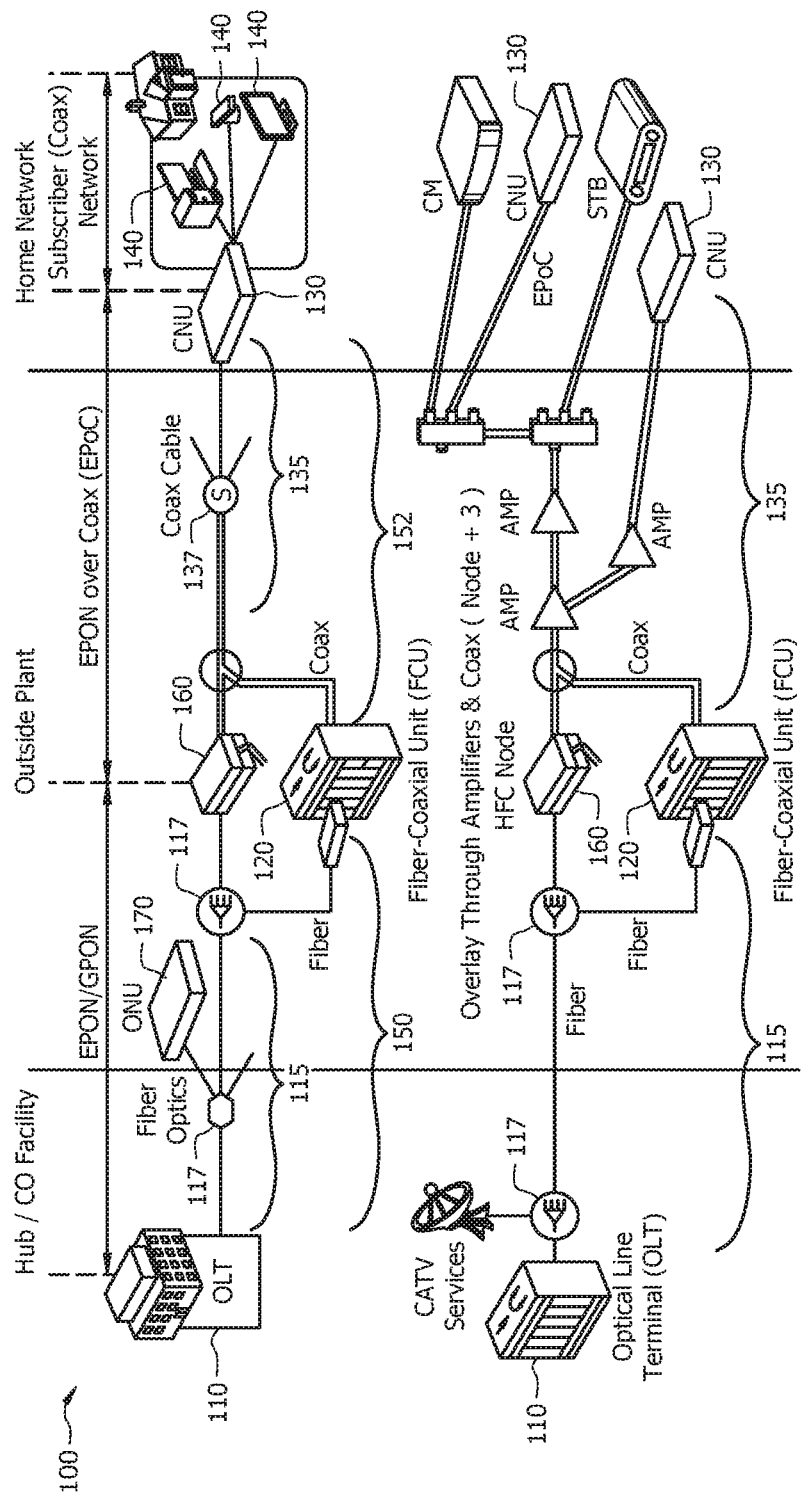
FIG. 1 is a schematic diagram of an embodiment of a unified optical-coaxial network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An EPoC system may be a hybrid access network employing both optical and coaxial technologies. The EPoC may comprise an optical segment that may comprise a PON, and a coaxial segment that may comprise a coaxial cable network. In the PON segment, an OLT may be positioned in a local exchange or central office where the OLT may connect the EPoC access network to an Internet Protocol (IP), Synchronous Optical Network (SONET), and/or Asynchronous Transfer Mode (ATM) backbone. In the coaxial segment, CNUs may be positioned at end-user locations, and each CNU may serve a plurality (e.g. three to four) of end users which may be known as subscribers. An FCU may merge the interface between the PON segment and the coaxial segment of the network. The FCU may be a single box unit that may be located where the optical and electrical networks are coupled together, for example, at a curb or at a basement of an apartment building.

PON systems may be assumed secure as all elements of a PON system may be controlled by a PON operator. CNUs may be positioned on a customer premises, and, due to the passive tree transmission nature of an EPoC network, each CNU may receive data directed to other CNUs. As each CNU may receive other CNUs data, CNUs may be subjected to eavesdropping, and may not be considered secure. As such, EPoC CNUs may create security concerns that may not be present in optical only networks.

Disclosed herein are mechanisms to exchange and update security keys with CNUs in an EPoC network. The keys may be employed to encrypt and/or decrypt messages to defeat eavesdropping by listeners other than the intended CNU. In an embodiment, the CNU may request and receive a security key from an OLT upon being authenticated into an EPoC network. The key may be encrypted to prevent the key from being obtained by other listeners. The FCU positioned between the OLT and CNU, may act as a repeater, and may transparently pass the key to the CNU. In another embodiment, the FCU may be configured in a bridge mode and may act as a proxy by generating key(s) and/or maintaining separate security domains in the optical network and the electrical network. Such keys may be employed to encrypt downstream messages only and/or bi-directional messages. The FCU and/or OLT may further transfer updated security keys upon expiration of a timer. The OLT and/or FCU may also verify that a switchover to an updated key is successful.

FIG. 1 is a schematic diagram of an embodiment of a unified optical-coaxial network 100 comprising an optical domain 150, e.g. a fiber/PON domain, and a coaxial domain 152, e.g. an EPoC domain. The network 100 may include an OLT 110, at least one CNU 130 coupled to a plurality of subscriber devices 140, and an FCU 120 positioned between the OLT 110 and the CNU 130, e.g., between the optical domain 150 and the coaxial domain 152. The OLT 110 may be coupled via an ODN 115 to the FCUs 120, and optionally to one or more ONUs 170, or one or more Hybrid Fiber-Coax (HFC) nodes 160 in the optical domain 150. The ODN 115 may comprise fiber optics, an optical splitter 117, and/or a cascade of 1×M passive optical splitters that couple OLT 110 to the FCU 120 and any ONUs 170. The value of M in EPoC, e.g., the number of FCUs, may for example be 4, 8, 16, or other values and may be selected by the operator depending on factors such as optical power budget. The FCU 120 may be coupled to the CNUs 130 via an electrical distribution network (EDN) 135, which may comprise a cable splitter 137, a cascade of taps/splitters, and/or one or more amplifiers. Each OLT 110 port may serve 32, 64, 128 or 256 CNUs 130. It should be noted that the upstream transmissions from CNUs 130 may reach the FCU 120 and not the other CNUs 130 due to a directional property of the tap. The distances between the OLT 110 and the ONUs 170 and/or FCUs 120 may range from about 10 to about 20 kilometers (km), and the distances between the FCU 120 and CNUs 130 may range from about 100 to about 500 meters (m). The network 100 may comprise any number of HFCs 160, FCUs 120 and corresponding CNUs 130. The components of network 100 may be arranged as shown in FIG. 1 or any other suitable arrangement.

The optical domain 150 of the network 100 may comprise a PON. The optical domain 150 may be a communications network that may not require active components to distribute data between the OLT 110 and the FCU 120. Instead, the optical domain 150 may employ the passive optical components in the ODN 115 to distribute data between the OLT 110 and the FCU 120. Examples of suitable protocols that may be implemented in the optical domain 150 may include asynchronous transfer mode PON (APON) or broadband PON (BPON) defined by the International Telecommunication Union (ITU) Telecommunication Standardization Sector (ITU-T) document G.983, Gigabit PON (GPON) defined by ITU-T document G.984, the EPON defined by IEEE documents 802.3ah and 802.3av, all of which are incorporated by reference as if reproduced in their entirety, the wavelength division multiplexing (WDM) PON (WDM-PON), and the Next Generation EPON (NGEPON) in development by IEEE.

The OLT 110 may be any device configured to communicate with the CNUs 130 via the FCU 120. The OLT 110 may act as an intermediary between the FCUs 120 and/or CNUs 130 and another backbone network (e.g. the Internet). The OLT 110 may forward data received from a backbone network to the FCUs 120 and/or CNUs 130 and forward data received from the FCUs 120 or CNUs 130 onto the backbone network. Although the specific configuration of the OLT 110 may vary depending on the type of optical protocol implemented in the optical domain 150, in an embodiment, OLT 110 may comprise an optical transmitter and an optical receiver. When the backbone network employs a network protocol that is different from the protocol used in the optical domain 150, OLT 110 may comprise a converter that may convert the backbone network protocol into the protocol of the optical domain 150. The OLT converter may also convert the optical domain 150 protocol into the backbone network protocol. In an embodiment, the OLT 110 may be configured to act as a Data Over Cable Service Interface Specification (DOCSIS) device, and may implement a DOCSIS Provisioning of EPON (DPoE) scheme and/or a DOCSIS Provisioning of GPON (DPoG) scheme as discussed in DOCSIS document DPoE-SP-IPNEv1.0-I06-130808, which is incorporated by reference.

The ODN 115 may be a data distribution system that may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the FCU 120. It should be noted that the optical fiber cables may be replaced by any optical transmission media in some embodiments. In some embodiments, the ODN 115 may comprise one or more optical amplifiers. In some embodiments, data distributed across the ODN may be combined with cable television (CATV) services using multiplexing schemes. The ODN 115 may extend from the OLT 110 to the FCU 120 and any optional ONUs 170 in a branching configuration as shown in FIG. 1, but may be alternatively configured as determined by a person of ordinary skill in the art. The OLT 110 may also manage security between the OLT 110 and the FCU 120 and/or between the OLT 110 and the CNUs 130 as discussed herein below.

The FCU 120 may be any device or component configured to forward downstream data from the OLT 110 to the corresponding CNUs 130 and forward upstream data from the CNUs 130 to the OLT 110. The FCU 120 may convert the downstream and upstream data appropriately to transfer the data between the optical domain 150 and the coaxial domain 152. The data transferred over the ODN 115 may be transmitted and/or received in the form of optical signals, and the data transferred over the EDN 135 may be transmitted and/or received in the form of electrical signals that may have the same or different logical structure as compared with the optical signals. As such, the FCU 120 may encapsulate or frame the data in the optical domain 150 and the coaxial portion 152 differently. In an embodiment, the FCU 120 may include a Media Access Control (MAC) layer and physical (PHY) layers, corresponding to the type of signals carried over the respective media. The MAC layer may provide addressing and channel access control services to the PHY layers. As such, the PHY may comprise an optical PHY and a coaxial PHY. In many embodiments, the FCU 120 may be transparent to the CNU 130 and OLT 110 in that the frames sent from the OLT 110 to the CNU 130 may be directly addressed to the CNU 130 (e.g. in the destination address), and vice-versa. As such, the FCU 120 may intermediate between network portions, namely an optical domain 150 and a coaxial portion 152 in the example of FIG. 1. In some embodiments, the FCU 120 may be configured to operate as a repeater or as a bridge. When operating as a repeater, the FCU 120 may transparently forward data between the ODN 115 and the EDN 135 by performing opto-electrical conversions without altering the associated signals. A repeater FCU 120 may perform only Open Systems Interconnection (OSI) layer 1 functions. When operating as a bridge, the FCU may perform routing functions, data alterations, security functions, etc. For example, an FCU 120 in bridge mode may maintain separate security domains between the ODN 115 and the EDN 135. The FCU 120 may also act as a proxy, a relay, etc., and may perform security authentication, security key generation, message encryption, message decryption, and/or other security or routing functions as discussed more fully herein below.

The ONUs 170 may be any devices that are configured to communicate with the OLT 110 and may terminate the optical domain 150 of the network. The ONUs 170 may present customer service interfaces to end users.

The coaxial domain 152 of the network 100 may be similar to any known electrical communication system. The coaxial domain 152 may not require any active components to distribute data between the FCU 120 and the CNU 130. Instead, the coaxial domain 152 may use the passive electrical components in the EDN 135 to distribute data between the FCU 120 and the CNUs 130. Alternatively, the coaxial domain 152 may use some active components, such as amplifiers. Examples of suitable protocols that may be implemented in the coaxial domain 152 include Multimedia over Coax Alliance (MoCA), G.hn, Home Phoneline Networking Alliance (HPNA), and Home Plug A/V.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the FCU 120 and the CNU 130. It should be noted that the electrical cables may be replaced by any electrical transmission media in some embodiments. In some embodiments, the EDN 135 may comprise one or more electrical amplifiers. The EDN 135 may extend from the FCU 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the FCU 120, and any subscriber devices 140. The CNUs 130 may act as intermediaries between the FCU 120 and the subscriber devices 140. For instance, the CNUs 130 may forward data received from the FCU 120 to the subscriber devices 140, and may forward data received from the subscriber devices 140 toward the OLT 110. Although the specific configuration of the CNUs 130 may vary depending on the type of network 100, in an embodiment, the CNUs 130 may comprise an electrical transmitter configured to send electrical signals to the FCU 120 and an electrical receiver configured to receive electrical signals from the FCU 120. Additionally, the CNUs 130 may comprise a converter that may convert FCU 120 electrical signals into electrical signals for the subscriber devices 140, such as signals in IEEE 802.11 wireless local area network (WiFi) protocol. The CNUs 130 may further comprise a second transmitter and/or receiver that may send and/or receive the converted electrical signals to the subscriber devices 140. The CNUs 130 may be typically located at distributed locations, such as the customer premises, but may be located at other locations as well.

The subscriber devices 140 may be any devices configured to interface with a user or a user device. For example, the subscribed devices 140 may include cable modems (CMs) desktop computers, laptop computers, tablets, mobile telephones, residential gateways, televisions, set-top boxes (STBs), and similar devices.

Due to the nature of fiber optic communications, PONs such as ODN 115 may be naturally secure from eavesdropping and other forms of security threats. As such, PONs may not generally transport encrypted communications. In contrast, electrical networks such as EDN 135 may be susceptible to such security threats, for example because electrical lines may be passively monitored without interrupting a connection. Further, unauthorized devices may attempt to take advantage of the broadcast nature of an EPoC network to eavesdrop on communications received at a first CNU 130 that are intended for an unrelated second CNU 130. Additionally, unauthorized devices may actively attempt to impersonate an authorized CNU 130. As such, EDN 135 may not be considered secure. Accordingly, network 100 may employ any of the protocols discussed herein to encrypt and exchange security keys between an OLT 110, a specific FCU 120, and a specific CNU 130. Once keys are securely exchanged, network 100 may encrypt and/or decrypt communications by employing the keys. Further, keys may be set to expire, for example based on a timer. Network 100 may employ any of the protocols disclosed herein to switchover from a first key/set of keys to a second key/set of keys and/or verify completion of the switchover.

Figure 2:
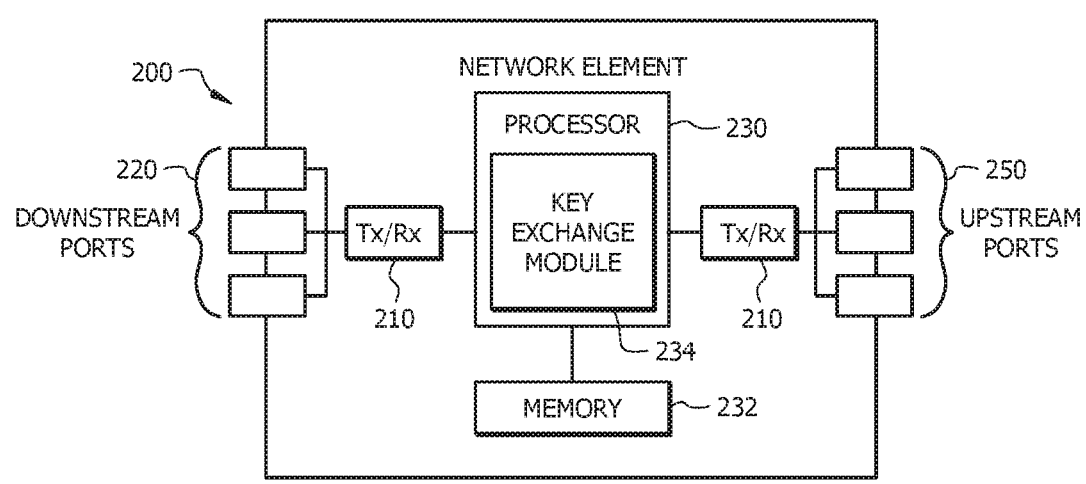
FIG. 2 is a schematic diagram of an embodiment of a network element (NE), which may act as a node in a unified optical-coaxial network.

FIG. 2 is a schematic diagram of an embodiment of an NE 200, which may act as an OLT, FCU, and/or CNU, (e.g. OLT 110, FCU 120, and/or CNU 130, respectively) by implementing any of the schemes described herein. In some embodiments NE 200 may also act as other node(s) in the network 100. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. The downstream ports 220 and/or upstream ports 250 may contain electrical and/or optical transmitting and/or receiving components for communicating with downstream and/or upstream networks, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a security module 234, which may be configured to exchange security keys, authenticate devices, perform switchovers, verify switchover completion, encrypt communications, and/or perform any protocols disclosed herein. In an alternative embodiment, the security module 234 may be implemented as instructions stored in the memory devices 232, which may be executed by processor 230. In another alternative embodiment, the security module 234 may be implemented on separate NEs 200. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230, memory device 232, Tx/Rx 210, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
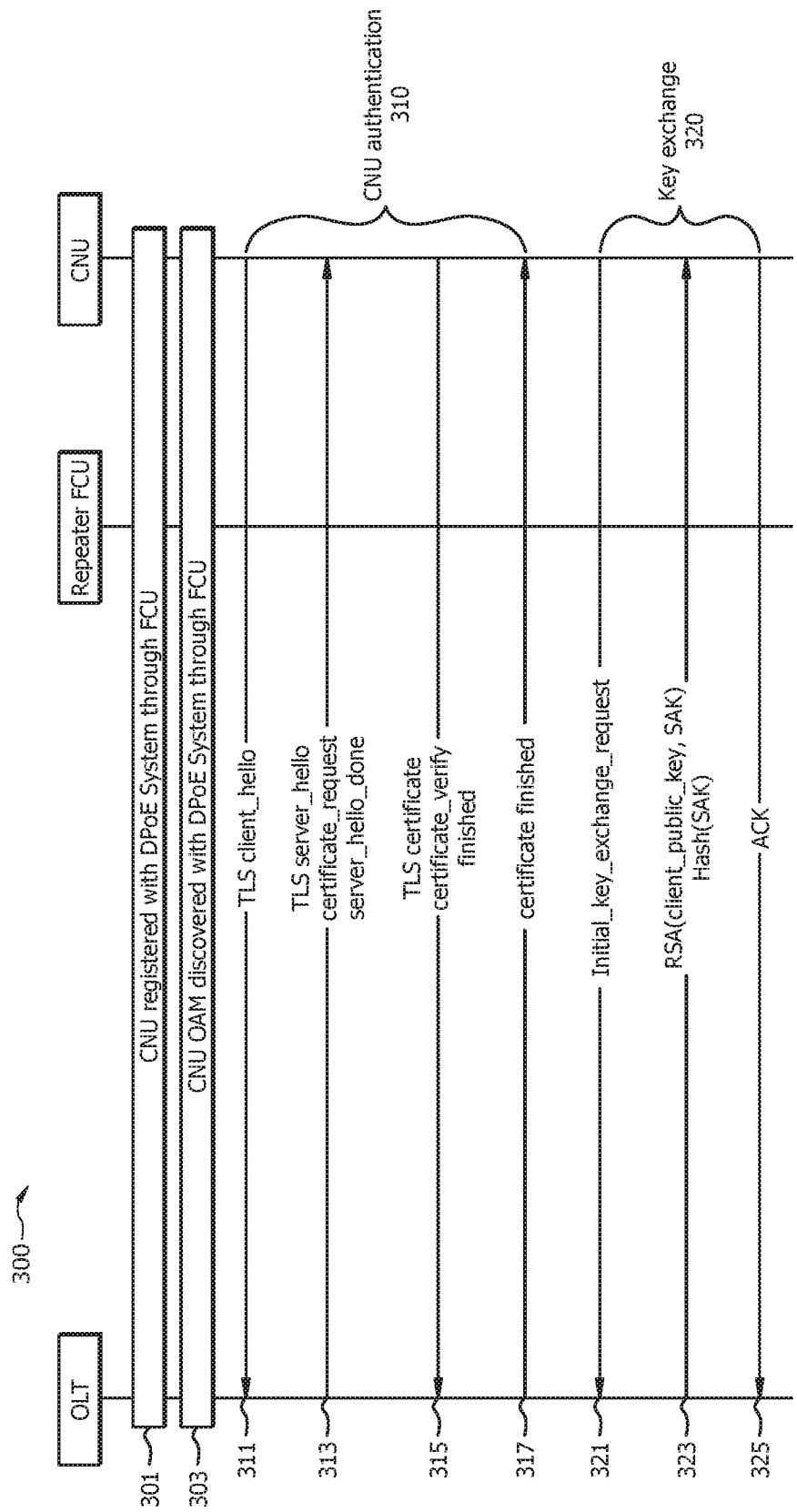
FIG. 3 is a protocol diagram of an embodiment of a method of a downstream authentication and key exchange via a repeater FCU.

FIG. 3 is a protocol diagram of an embodiment of a method 300 of a downstream authentication and key exchange via a repeater FCU, which may be implemented in a network such as network 100 by employing an OLT, an FCU operating in repeater mode, and a CNU, such as OLT 110, FCU 120, and CNU 130, respectively. As the FCU operates as a repeater, the FCU may forward communications between the OLT and the CNU, and may remain substantially transparent to the communications from a protocol standpoint. At step 301, CNU may connect to the network and may register with a DPoE/DPoG system operating on the OLT by communicating with the OLT via the FCU. During registration, the CNU may be assigned a unique logical link identifier (LLID) which may be employed to designate particular communications as destined for/received from the CNU. All communications between the CNU and the OLT may be transmitted via the logical link associated with the assigned LLID. At step 303, a DPoE/DPoG system on the OLT may discover, via the FCU, CNU capabilities by exchanging Operations, Administration, and Maintenance (OAM) message(s) with the CNU.

CNU authentication may be performed at step 310 by performing steps 311, 313, 315, and/or 317. At step 311, the CNU may transmit a Transport Layer Security (TLS) client hello message to the OLT, which may initiate a handshake with the OLT. At step 313, in response to the TLS client hello, the OLT may transmit one or more messages comprising a TLS server hello, a certificate request to request a certificate from the CNU, and a TLS hello done to indicate that the handshake is complete. At step 315, the CNU may transmit the requested TLS certificate to the OLT. The certificate may be employed by the OLT to verify that the CNU is an authorized CNU and not an intruder. The CNU may further transmit certificate verify and/or finished message(s) to request that the OLT verify the certificate and indicate that the certificate transmission is complete. At step 317, the OLT may transmit a certificate finished message to indicate that the certificate is verified and the CNU is authenticated. It should be noted that the OLT may also transmit a separate success message to indicate successful verification in some embodiments.

At step 320, the OLT may exchange security keys with the CNU for use in communication encryption by employing steps 321, 323, and/or 325. At step 321, the CNU may transmit an initiate key exchange request to the OLT. The initiate key exchange request may comprise a public key for the CNU. At step 323, the OLT may select a random Secure Attention Key (SAK) for communications with the CNU. The SAK may be encrypted with a Rivest, Shamir, Adleman (RSA) algorithm by employing the public key from the CNU. The OLT may then transmit RSA encrypted SAK to the CNU along with a hash of the SAK, which may be employed by the CNU to validate the SAK. At step 325, the CNU may employ a private key associated with the public key to decrypt and validate the SAK. The CNU may then transmit an acknowledgment to the OLT to indicate that the SAK has been received and/or installed. The public key and private key may be selected in accordance to ITU-T document recommendation X.509, which is incorporated by reference. Once decrypted and/or installed on the CNU, the SAK may be employed to encrypt/decrypt downstream and/or upstream communications between the OLT and the CNU, in order to ensure the CNU and the OLT (but not unauthorized devices) can decrypt the communications. Method 300 may be employed to prevent CNUs and/or unauthorized devices connected to the CNUs from eavesdropping on downstream communications associated with other CNUs. As such, each CNU on a tree from the OLT may receive downstream frames for all other CNUs on the tree. However, each CNU may only be capable of decrypting its own frames. Further, unauthorized listening devices positioned between the CNU and the OLT may be unable to decrypt frames transmitted between the OLT and CNU (e.g. upstream and/or downstream).

Figure 4:
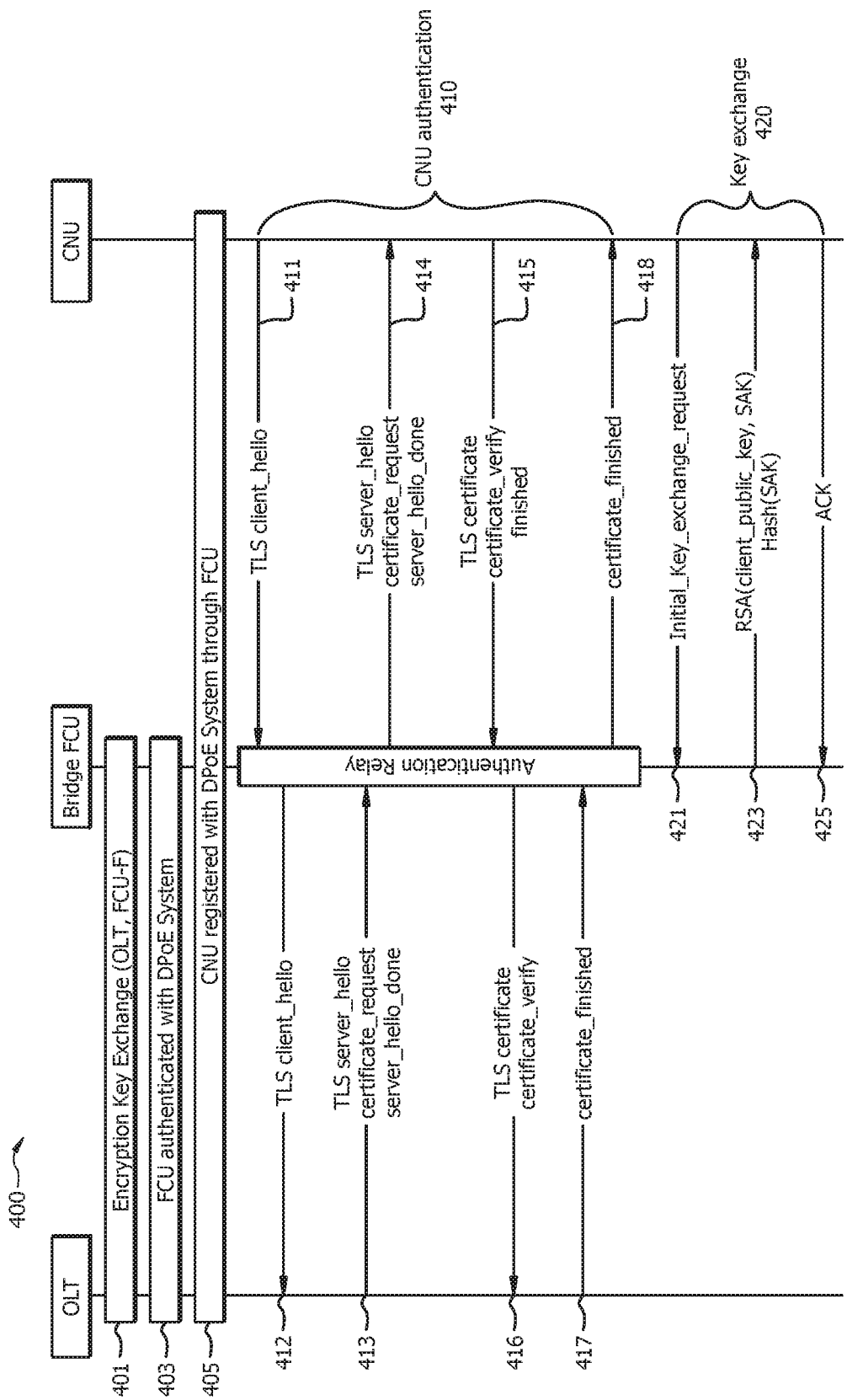
FIG. 4 is a protocol diagram of an embodiment of a method of a downstream authentication and key exchange via a bridge FCU.

FIG. 4 is a protocol diagram of an embodiment of a method 400 of a downstream authentication and key exchange via a bridge FCU, which may be implemented in a network such as network 100 by employing an OLT, an FCU operating in bridge mode, and a CNU, such as OLT 110, FCU 120, and CNU 130, respectively. Method 400 may be similar to method 300, but may employ an authentication relay at the FCU to manage encryption in the electrical domain. Method 400 may be employed to allow management of the downstream encryption in the electrical domain to be shifted from the OLT to the FCU. At step 401, the OLT may exchange encryption keys with the fiber/optical side of the FCU. At step 403, the FCU may be authenticated by a DPoE and/or DPoG system operating on the OLT. At step 405, the CNU may be registered with the DPoE and/or DPoG system operating on the OLT in a manner substantially similar to step 301. The CNUs capabilities may also be discovered at step 405 in a manner similar to step 303. At step 410, the CNU may be authenticated via steps 411-418. Steps 411, 413, 415, and 417 may be substantially similar to steps 311, 313, 315, and 317, respectively. However, the messages of steps 411, 413, 415, and 417 may be intercepted and/or interpreted by the FCU prior to being forwarded at steps 412, 414, 416, and 418, respectively. At step 420, the FCU may exchange keys with the CNU by employing steps 421, 423, and 425. Steps 421, 423, and 425 may be substantially similar to steps 321, 323, and 325, but the FCU may be the entity responsible for generating and transmitting the encrypted SAK to the CNU. The bridged FCU may maintain responsibility for encrypting/decrypting messages across the electrical domain and the OLT may maintain responsibility for encrypting/decrypting messages across the optical domain. The FCU may receive encrypted messages from the OLT, decrypt the messages, re-encrypt them for the electrical domain (e.g. by employing a difference SAK), and forward them to the CNU, and vice versa. In an alternate embodiment, the messages may not be encrypted across the optical domain and may only be encrypted across the electrical domain (e.g. by the FCU).

Figure 5:
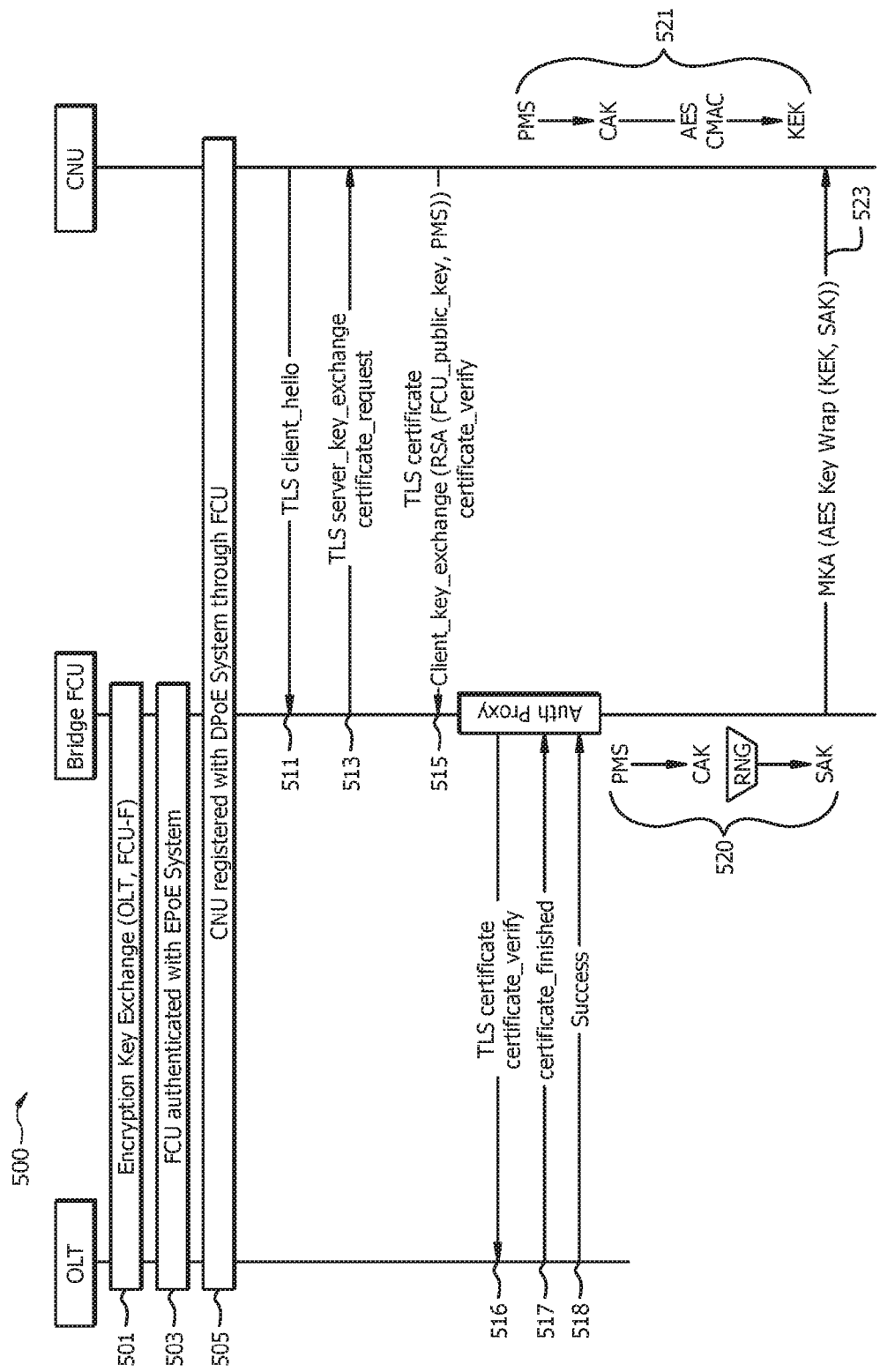
FIG. 5 is a protocol diagram of an embodiment of a method of a bidirectional authentication and key exchange via a bridge FCU.

FIG. 5 is a protocol diagram of an embodiment of a method 500 of a bidirectional authentication and key exchange via a bridge FCU, which may be implemented in a network such as network 100 by employing an OLT, an FCU operating in bridge mode, and a CNU, such as OLT 110, FCU 120, and CNU 130, respectively. Steps 501, 503, 505, and 511 may be substantially similar to steps 401, 403, 405, and 411 respectively. The FCU may comprise an authentication proxy that may accept the TLS client hello message of 511 and may transmit a TLS server key exchange request and certificate request to the CNU without communicating with the OLT at step 513. The server key exchange request may comprise an RSA public key for the FCU. The FCU may employ a 2048 bit public key/private key pair to support the exchange of a Pre-Master Secret (PMS).

At step 515, the CNU may initiate bidirectional authentication by transmitting a TLS certificate upon receiving the certificate request of step 513. The CNU may also transmit a client key exchange message, and/or a certificate verify message to request verification of the certificate. The CNU may generate a PMS to include in the client key exchange message, which may be employed by the FCU when generating an associated SAK. The PMS value may be encrypted using an RSA algorithm and a public key associated with the FCU. The FCU may be aware of the private key associated with the public key and may employ the private key to decrypt the PMS. A bridge mode FCU may not comprise a certificate and/or authentication function, so the FCU may relay the CNU TLS certificate and the certificate verify to the OLT at step 516 in a manner similar to step 416. The OLT may transmit a certificate finished message at step 517 to acknowledge receipt of the certificate in a manner similar to step 417. At step 518, the OLT may further transmit a success message to indicate successful authentication of the CNU certificate.

Upon receiving the success message of step 518, the FCU may perform step 520 to generate the SAK for message encryption. For example, the PMS received from the CNU at step 515 may be employed to generate a Connectivity Association Key (CAK). An Advanced Encryption Standard (AES) Cipher-based Message Authentication Code (CMAC) may be applied to the CAK to generate a Key Encryption Key (KEK). AES CMAC is discussed in Internet Engineering Task Force (IETF) document Request For Comment (RFC) 4493, which is incorporated by reference. CAK and KEK are discussed in IEEE document 802.1X, which is incorporated by reference. The FCU may employ a Random Number Generator (RNG) to generate a random SAK and encrypt the SAK using the KEK by employing an AES key wrap algorithm as discussed in IETF document RFC 3394, which is incorporated by reference. The encrypted SAK may be transmitted to the CNU using a MACsec Key Agreement (MKA) protocol message as discussed in IEEE 802.1AE, which is incorporated by reference.

At step 521, the CNU may generate the KEK from the PMS in a manner similar to step 520. Upon receiving the MKA message from step 523, the CNU may employ the derived KEK to decrypt the message and obtain the SAK. The SAK may then be employed by the CNU and/or FCU to encrypt upstream and/or downstream communications across the electrical domain. Such communications may be encrypted/decrypted by the FCU for transmission to/from the optical domain. Such communications may be encrypted when transmitted across the optical domain by employing a key transmitted in step 501, employing some other encryption mechanism, and/or may be transmitted in plain text.

Figure 6:
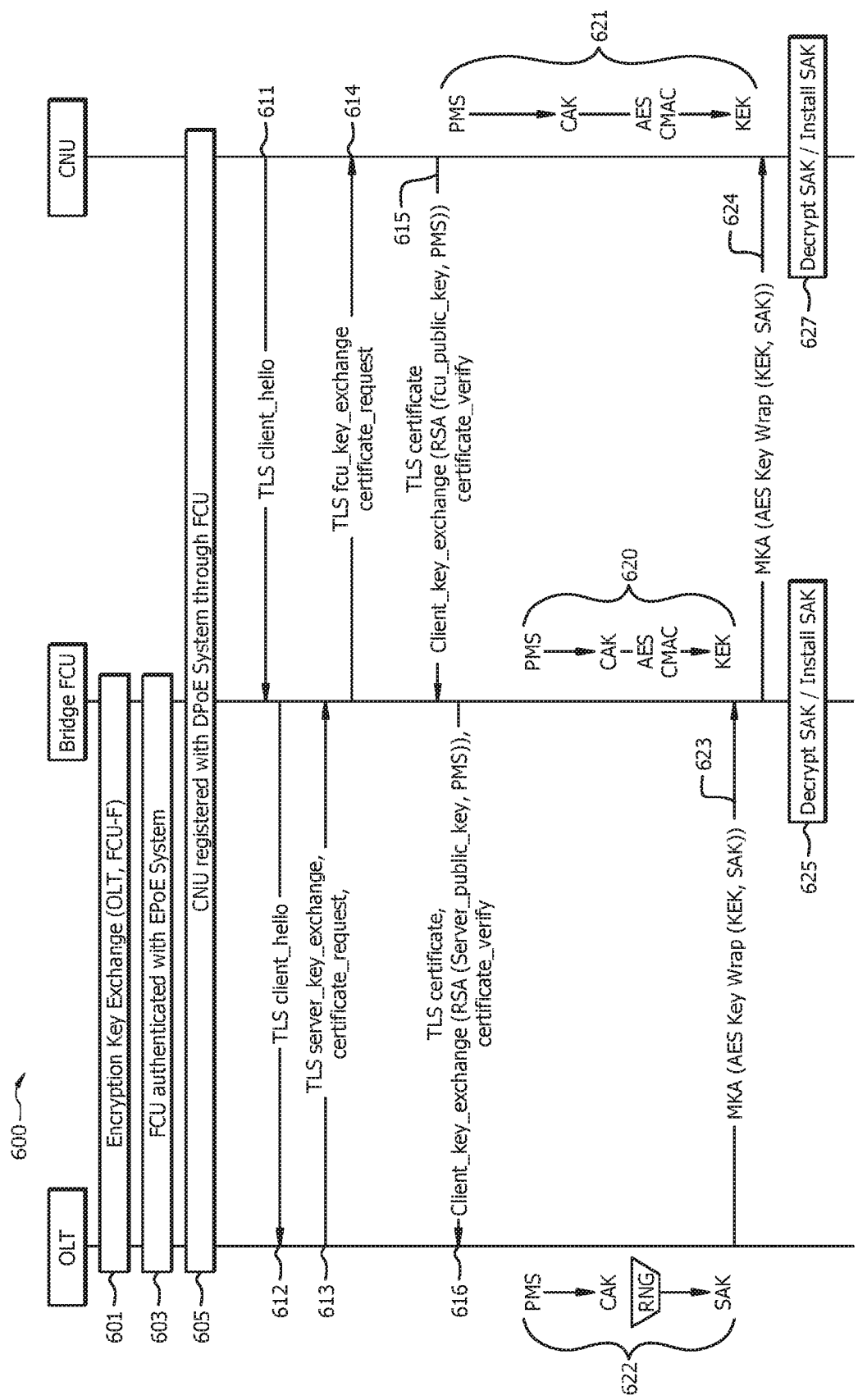
FIG. 6 is a protocol diagram of another embodiment of a method of a bidirectional authentication and key exchange via a bridge FCU.

FIG. 6 is a protocol diagram of another embodiment of a method 600 of a bidirectional authentication and key exchange via a bridge FCU, which may be implemented in a network such as network 100 by employing an OLT, an FCU operating in bridge mode, and a CNU, such as OLT 110, FCU 120, and CNU 130, respectively. Method 600 may comprise steps similar to methods 400 and/or 500, but may pass the PMS to the OLT for generation of the SAK. Steps 601, 603, 605, 611, and 612 may be substantially similar to steps 401, 403, 405, 411, and 412, respectively. Upon receiving the TLS client hello message of step 612, the OLT may transmit a TLS server key exchange and certificate request message at step 613 in a manner similar to step 513. The certificate request message may comprise a public key for the OLT. At step 614, the FCU may transmit a TLS FCU key exchange and certificate request message to the CNU. The message of step 614 may be similar to the message of step 613, but may comprise the public key for the FCU instead of or in addition to the public key for the OLT. At step 615, the CNU may employ the FCU public key to transmit a PMS to the FCU in a manner similar to step 515. At step 616, the FCU may obtain the PMS and forward the PMS to the OLT by employing the OLT public key in a manner similar to step 615. At step 622, the OLT may create a CAK by employing the PMS and may generate an SAK in a manner similar to step 520. At steps 620 and 621, the FCU and the CNU, respectively, may generate the KEK by employing the PMS in a manner similar to step 521. At step 623, the OLT may transmit the SAK in an MKA message encrypted by the KEK in a manner similar to step 523. At step 624, the FCU may forward the MKA message to the CNU. At steps 625 and 627, the FCU and the CNU, respectively, may decrypt the MKA message by employing the KEK to obtain that SAK. The SAK may then be employed for upstream and/or downstream communications between the OLT and the CNU. Security may be enforced by the OLT, the FCU, and the CNU as each device may be aware of the SAK.

Figure 7:
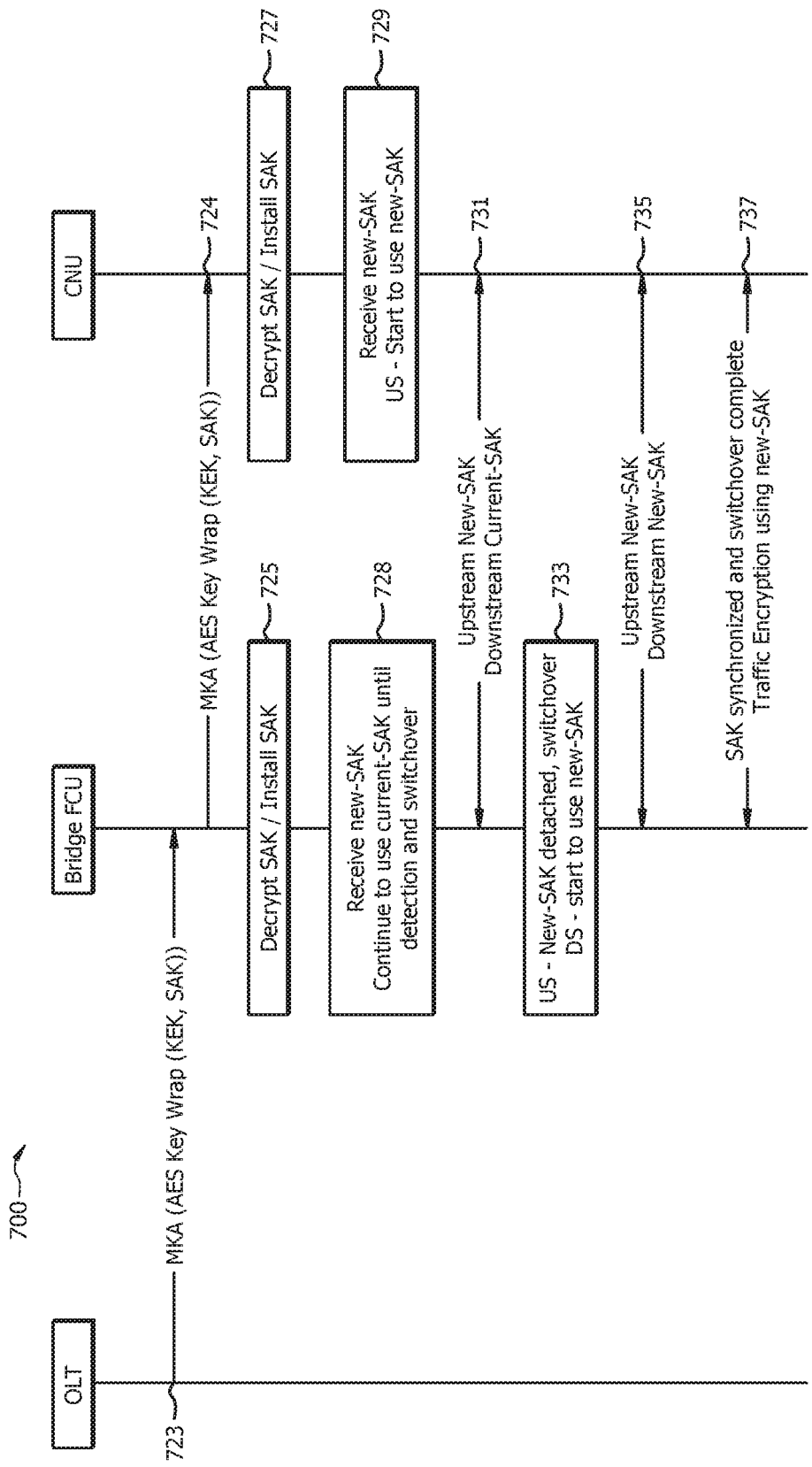
FIG. 7 is a protocol diagram of an embodiment of a method of key switchover via a bridge FCU.

FIG. 7 is a protocol diagram of an embodiment of a method of key switchover via a bridge FCU, which may be implemented in a network such as network 100 by employing an OLT, an FCU operating in bridge mode, and a CNU, such as OLT 110, FCU 120, and CNU 130, respectively. The SAK encryption keys distributed in methods 300-600 may be set to expire, for example upon expiration of a timer. Method 700 may be employed to switch from a previously distributed SAK to an updated KAK without interrupting communication flow. At step 723, the OLT may transmit an updated SAK to the FCU in an MKA message in a manner similar to step 623. The FCU may forward the MKA message to the CNU at step 724. At steps 725 and 727, the FCU and CNU, respectively, may decrypt and/or install the updated SAK. It should be noted that in embodiments where the FCU manages the SAK, step 723 may be omitted and the FCU may generate the SAK and transmit the MKA message of step 724 without input from the OTL. In such a case, the SAK may be generated by the FCU rendering decryption by the FCU unnecessary.

At step 728, the FCU may have received the updated/new-SAK. The FCU may continue to employ the current/old-SAK until use by the CNU is detected to prevent messages already in transit from becoming unusable by the CNU (e.g. in case such messages arrive before the updated SAK is configured at the CNU). At step 729, the CNU may receive the updated SAK and may begin employing the updated SAK for all upstream communications. As the FCU sent the updated SAK, the CNU may assume the FCU can already employ the updated SAK. The CNU may also retain the current SAK for decrypting downstream communications until the switchover is complete. At step 731, all upstream communications may employ the updated SAK, while all downstream communications may continue to employ the current SAK. The FCU may maintain both the updated and the current key and may accept and decrypt any received cipher-text with either key. At step 733, the FCU may receive a message from the CNU that employs the updated key. The FCU may detect that the message employs the updated key by key identification data stored in the frame preamble of the message. The FCU may then switchover and begin transmitting all downstream messages with the updated key. At step 735, both downstream and upstream communications may employ the updated SAK. At step 737, the CNU may begin receiving downstream communications encrypted by the updated key, at which point the SAK usage may be synchronized and switchover may be considered complete. The updated SAK may be employed for bidirectional communication until the updated SAK expires, for example due to a timer expiration. Such a timer may be initiated upon transmission of the MKA message at step 723 and/or 724, upon synchronization detection at step 733, and/or any other step in method 700. Upon expiration of the timer, the updated SAK may be treated as a current/old SAK and another updated/new SAK may be assigned via method 700.

Figure 8:
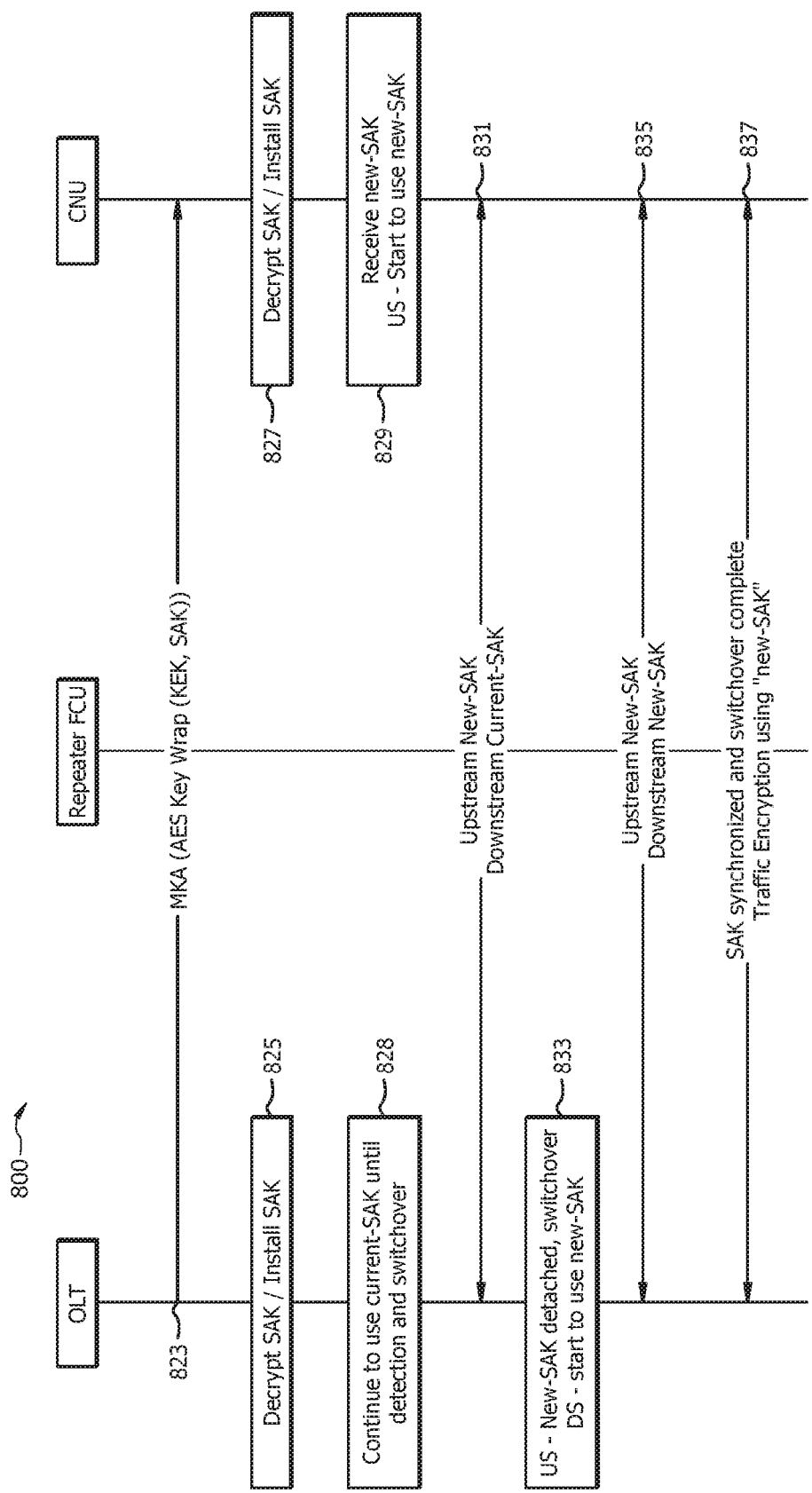
FIG. 8 is a protocol diagram of an embodiment of a method of key switchover via a repeater FCU.

FIG. 8 is a protocol diagram of an embodiment of a method 800 of key switchover via a repeater FCU, which may be implemented in a network such as network 100 by employing an OLT, an FCU operating in repeater mode, and a CNU, such as OLT 110, FCU 120, and CNU 130, respectively. Method 800 may be similar to method 700, but may employ an FCU that remains transparent to the switchover, which may result in management by the OLT instead of the FCU. At step 823, the OLT may transmit an MKA message with an encrypted updated SAK in a manner similar to step 723. At steps 825 and 827, the OLT and CNU, respectively, may decrypt and/or install the updated SAK in a manner similar to steps 725 and 727. At step 828, the OLT may continue to employ a current key for downstream communication encryption and prepare to decrypt upstream communications via either the current or the updated key in a manner similar to step 728. At step 829, the CNU may receive the updated SAK and begin employing the updated SAK for upstream communications as in step 729. At step 831, all upstream communications may employ the updated SAK, while all downstream communications may continue to employ the current SAK. Steps 833, 835, and 837 may be substantially similar to steps 733, 735, and 737, but may be performed in pertinent part on the OLT instead of the FCU.

Figure 9:
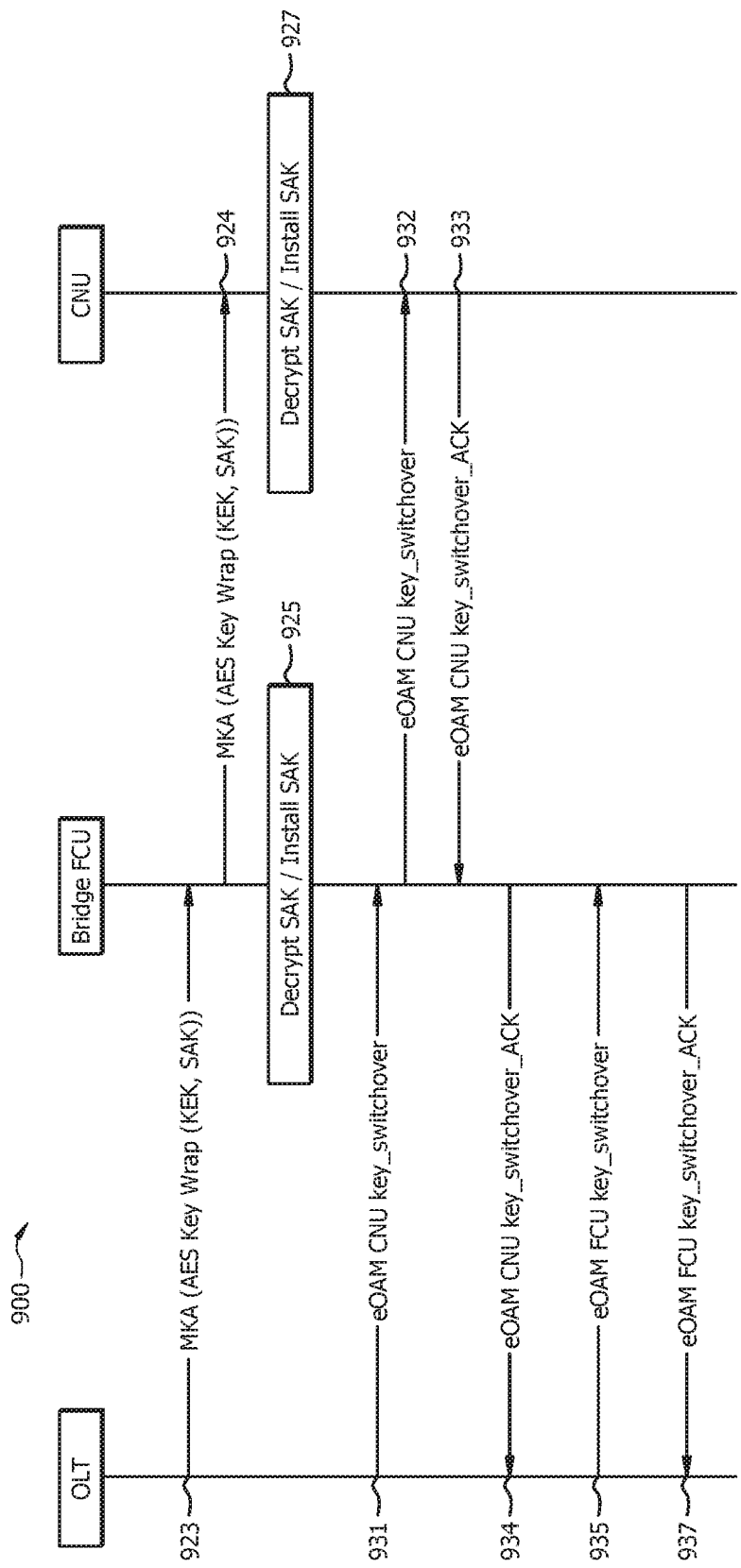
FIG. 9 is a protocol diagram of an embodiment of a method of key switchover verification.

FIG. 9 is a protocol diagram of an embodiment of a method 900 of key switchover verification, which may be implemented in a network such as network 100 by employing an OLT, an FCU operating in bridge mode, and a CNU, such as OLT 110, FCU 120, and CNU 130, respectively. Method 900 may be employed when explicit confirmation of switchover is desired at the OLT. Steps 923, 924, 925, and 927, may be substantially similar to steps 723, 724, 725, and 727, respectively. Upon completion of steps 925 and 927, the FCU and the CNU, respectively, may begin transmitting upstream communications encrypted by the updated SAK. At step 931, the OLT may transmit an Ethernet OAM (eOAM) CNU key switchover message to the FCU to request verification that the updated SAK was successfully received and installed by the CNU at steps 924 and 927, respectively. At step 932, the FCU may forward the eOAM CNU key switchover message to the CNU. At step 933, the CNU may transmit an eOAM CNU key switchover acknowledgement message to indicate that switchover was successful at the CNU. The FCU may then begin employing the updated SAK for encrypting downstream communications. At step 934, the eOAM CNU key switchover acknowledgement message may be forwarded to the OLT. At step 935, the OLT may transmit an eOAM FCU key switchover message to the FCU to verify that the updated SAK was successfully received and installed by the FCU at steps 923 and 925, respectively. At step 937, the FCU may transmit an eOAM FCU key switchover acknowledgement message to indicate that switchover was successful at the FCU. Upon receiving both acknowledgements (e.g. 934 and 937), the OLT may begin employing the updated SAK for downstream communications.

In summary of the material discussed herein, this disclosure describes extensions to DPoE specifications to support subscriber data privacy and traffic encryption in an EPoC network. Subscriber data privacy may include device authentication and key exchanges to verify that FCU and CNU (and accompanying certificates) can ensure data path encryption for subscriber data. In an EPoC Network, the DPoE System may use the FCU fiber interface (FCU-F) MAC address as the identity of the FCU, and use the CNU MAC address as the identity of the CNU. When a CNU that is connected to a repeater FCU (R-FCU) is powered on, each logical link may report its MAC address to the DPoE System through a Multi-Point Control Protocol (MPCP) discovery process. When a CNU that is connected to bridge FCU (B-FCU) is powered on, the CNU may register its logical links with the B-FCU. The B-FCU may report the MAC address of each logical link to the DPoE System using an OAM message as discussed herein. When a B-FCU or an R-FCU is powered on, it may report each logical link coupled to the EPON to the DPoE System.

In an EPoC network the DPoE System (e.g. in the OLT) may authenticate each CNU and FCU using ITU-T X.509 certificates as specified herein. This disclosure specifies mechanisms and protocols to support bidirectional traffic encryption between a DPoE System and a CNU through an R-FCU, bidirectional traffic encryption between an B-FCU and a CNU over a coax link, and bidirectional traffic encryption between a DPoE System and a B-FCU over an EPON link.

An EPoC Network with a R-FCU, a DPoE System and a CNU may support bidirectional end-to-end traffic encryption and CNU authentication as specified herein. In an EPoC Network with a B-FCU, the traffic may be encrypted in two separate domains: the optical domain and coax domain. The B-FCU and CNU may support bidirectional traffic encryption in the coax domain as specified herein. The DPoE System and the B-FCU may support bidirectional traffic encryption in the optical domain as specified herein. To be able to forward traffic, B-FCU may decrypt traffic received from any one of the two domains. The B-FCU may encrypt traffic before forwarding it to the coax domain, when the coax domain uses different encryption keys. The B-FCU may encrypt traffic before forwarding it to the optical domain, when the optical domain uses different encryption keys.

The DPoE System may authenticate CNUs using X.509 certificates which may be retrieved using an Extensible Authentication Protocol (EAP)-TLS as discussed herein. The DPoE System may validate the CNU certificates and deny service to CNUs that present invalid certificates. Once the CNU has been successfully authenticated, LLID traffic can be encrypted using keys that are exchanged using the key exchange protocol specified herein.

When a key exchange occurs, the DPoE System may create a timer initialized to a configured value which may be at least 10 seconds and may not exceed 65,535 seconds. This timer may be used for a Key Exchange Timer Expiration Event. When a given logical link has been configured as a secure channel, the DPoE System may generate a 128-bit random key string associated with the link. The key string may be used to encrypt and decrypt data between the DPoE System and the CNU. New keys may be transmitted to the CNU using the MACSec Key Agreement (MKA) protocol. The key exchange mechanism may expire keys to limit the useful lifetime of a successful key extraction attack. The expiration of the key exchange timer may trigger the DPoE System to generate a new security key and transfer the new key to the CNU. The DPoE System may retain the original key and may transfer the new key with a different key identification number from the original. The DPoE System may accept and decrypt cipher-text with either the active or the next key. The key identification number transferred in the preamble of the cipher-text may identify the encryption key used by the CNU for that frame. FIG. 8 may depict a key exchange process employed when the key exchange timer expires.

After transferring a new-SAK to a CNU, the DPoE System may create a key switchover timer. Before this timer expires, the DPoE System may verify that the CNU is transferring cipher-text on the upstream logical link using the new-SAK. If the upstream logical link is still receiving plain-text, or traffic encrypted with the previous key when the key switchover timer expires, the DPoE System may signal an alarm to a management software, and may retransmit the key to the CNU. If after three consecutive attempts, the DPOE System does not detect that the upstream traffic on the logical link is using the new-SAK, the DPOE System may deregister the logical link. If the upstream traffic is encrypted using the new-SAK, the DPoE System may start using the new-SAK to encrypt downstream traffic and clear the key switchover timer.

A DPoE System and B-FCU may support authentication and bidirectional key exchange procedures as described herein. The authentication and bidirectional key exchange procedure between DPoE System and B-FCU may be similar to bidirectional procedures used between a DPoE System and a CNU with an R-FCU. After a CNU has successfully registered to a B-FCU, the DPoE System may employ procedures as discussed herein to authenticate the CNU. A DPoE System, B-FCU, and a CNU may use the key exchange procedures described herein to support bidirectional encryption over coax link. The DPoE System may send the MSK to B-FCU using an OAM message. When the B-FCU receives the OAM message the B-FCU may generate a CAK, KEK, and a new-SAK. When a SAK is successfully installed in the CNU, the CNU may encrypt frames transmitted using the SAK. The B-FCU may decrypt frames received from the CNU using the same SAK. The B-FCU may encrypt the frame using the optical domain SAK prior to upstream transmission, when the optical domain SAK is different from the SAK of the coax domain. In the downstream direction, the B-FCU may decrypt frames received from the DPoE System using the optical domain SAK. The B-FCU may process decrypted frames to determine the forwarding behavior for every frame. Prior to transmitting a frame to the CNU, the B-FCU may encrypt the frame using the coaxial domain SAK, when the optical domain SAK is different from the SAK of the coax domain.

When a key exchange occurs, the B-FCU may create a timer initialized to a configured value which may be at least ten seconds and may not exceed 65,535 seconds. When this timer expires, the B-FCU may generate a new-SAK. When a given CNU logical link has been configured as a secure channel, the B-FCU may generate a 128-bit random key string associated with the link. The key string (e.g. SAK) may be used to encrypt and decrypt data between the B-FCU and the CNU. The first time the SAK is generated may be when the B-FCU receives an MSK from a DPoE System. Afterwards the B-FCU may generate the SAK when the key exchange timer expires. New keys may be sent to the CNU using the MKA protocol. After the B-FCU has sent a new-SAK to the CNU, the B-FCU may start a switchover timer. The B-FCU may retain the current-SAK and the new-SAK. The B-FCU may continue to use the current-SAK for downstream traffic encryption until it detects that the CNU upstream traffic is encrypted with the new-SAK. As shown in FIG. 7, when the B-FCU detects that CNU upstream traffic is encrypted with the new-SAK, the B-FCU may start to use the new-SAK for the downstream traffic encryption and clear the new key switchover timer. When the key switchover timer expires, the B-FCU may retransmit the MKA message which includes the new-SAK to the CNU. If after 3 consecutive attempts, the B-FCU does not detect that the upstream traffic on the logical link is using the new-SAK, the B-FCU may deregister the logical link.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means ±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An Optical Line Terminal (OLT) comprising:
   a processor configured to:
      encrypt a first security key in a security key response message;
      encrypt a downstream message with the first security key;
      decrypt an upstream message with the first security key; and
      initiate a switchover from the first security key to a second security key upon expiration of a timer;
   a transmitter coupled to the processor and configured to transmit the security key response message comprising an encrypted first security key to a Fiber Coaxial Unit (FCU) via a Passive Optical Network (PON),
   wherein the switchover comprises:
      generating and encrypting the second security key by the processor;
      transmitting the encrypted second security key toward a Coaxial Network Unit (CNU) by the transmitter;
      encrypting downstream traffic with the first security key when upstream traffic from the CNU is encrypted with the second security key; and
      encrypting the downstream traffic with the second security key in response to receiving the upstream traffic that is encrypted with the second security key.

2. The OLT of claim 1, wherein the first security key in the security key response message is encrypted in response to a security key request from the FCU.

3. The OLT of claim 2, wherein the processor is further configured to generate the first security key in response to the security key request from the FCU.

4. The OLT of claim 1, wherein the transmitter is further configured to transmit the downstream message toward the CNU via the FCU and an Ethernet PON over Coaxial (EPoC) network.

5. The OLT of claim 1, further comprising a receiver coupled to the processor, wherein the receiver is coupled the PON and configured to receive a security key request from the FCU via the PON wherein the receiver is further configured to receive the upstream message from the CNU via the FCU and an Ethernet PON over Coaxial (EPoC) network.

6. The OLT of claim 1, wherein the transmitter is further configured to transmit a key switchover verification message to request an acknowledgement that the switchover is complete at the CNU.

7. The OLT of claim 6, wherein the transmitter is further configured to transmit the key switchover verification message to request an acknowledgement that the switchover is complete at the FCU.

8. A switchover method comprising:
   encrypting, by a processor of an Optical Line Terminal (OLT), a first security key in a security key response message;
   encrypting a downstream message with the first security key;
   decrypting an upstream message with the first security key; and
   initiating a switchover from the first security key to a second security key upon expiration of a timer, wherein the switchover comprises:
      generating and encrypting the second security key by the processor;
      transmitting, by a transmitter coupled to the processor and configured to transmit the security key response message comprising an encrypted first security key to a Fiber Coaxial Unit (FCU) via a Passive Optical Network (PON), the encrypted second security key toward a Coaxial Network Unit (CNU) by the transmitter;
      encrypting downstream traffic with the first security key when upstream traffic from the CNU is encrypted with the second security key; and
      encrypting the downstream traffic with the second security key in response to receiving the upstream traffic that is encrypted with the second security key.

9. The switchover method of claim 8, wherein encrypting the first security key in the security key response message is in response to a security key request from the FCU.

10. The switchover method of claim 9, further comprising generating, by the processor, the first security key in response to the security key request from the FCU.

11. The switchover method of claim 8, further comprising transmitting, by the transmitter, the downstream message toward the CNU via the FCU and an Ethernet PON over Coaxial (EPoC) network.

12. The switchover method of claim 8, further comprising:
   receiving, by a receiver coupled to the processor, a security key request from the FCU via the PON, wherein the receiver is coupled the PON; and
   receiving, by the receiver, an upstream message from the CNU via the FCU and an Ethernet PON over Coaxial (EPoC) network.

13. The switchover method of claim 8, further comprising transmitting, by the transmitter, a key switchover verification message to request an acknowledgement that the switchover is complete at the CNU.

14. The switchover method of claim 13, further comprising transmitting, by the transmitter, the key switchover verification message to request an acknowledgement that the switchover is complete at the FCU.

15. A method comprising:
   generating, by an Optical Line Terminal (OLT), an updated security key upon expiration of a key exchange timer;
   transferring, by the OLT, the updated security key to an endpoint;
   retaining an original security key, wherein the updated security key comprises a different key identification number than the original security key;
   accepting and decrypting upstream traffic that employs either the original security key or the updated security key;
   after transferring the updated security key to the endpoint, creating a key switchover timer;
   before the key switchover timer expires, verifying that upstream traffic transferred from the endpoint on a logical link uses the updated security key; and
   encrypting, in response to the upstream traffic being encrypted using the updated security key, the downstream traffic using the updated security key.

16. The method of claim 15, wherein the original security key and the updated security key each comprise a 128-bit random key string associated with the logical link.

17. The method of claim 15, further comprising clearing the key switchover timer after the upstream traffic is encrypted using the updated security key.

18. The method of claim 15, wherein the endpoint is a Fiber Coaxial Unit (FCU), and wherein the OLT transfers the updated security key to the FCU via a Passive Optical Network (PON).

19. The method of claim 15, wherein the endpoint is a Coaxial Network Unit (CNU), and wherein the OLT transfers the updated security key to the CNU via a Fiber Coaxial Unit (FCU) and an Ethernet Passive Optical Network (PON) over Coaxial (EPoC) network.

* * * * *

UNITED STATES PATENT AND TRADEMARK OFFICE
CERTIFICATE OF CORRECTION

PATENT NO. : 9,838,363 B2  
APPLICATION NO. : 14/995981  
DATED : December 5, 2017  
INVENTOR(S) : Yanbin Sun et al.

Page 1 of 1

It is certified that error appears in the above-identified patent and that said Letters Patent is hereby corrected as shown below:

Page 2, item (56), under Other Publications, Column 2, Lines 36-45 should read:
"Series G: Transmission Systems and Media, Digital Systems and Networks, Digital Sections and Digital Line System -- Optical Line Systems for Local and Access Networks, Broadband Optical Access Systems Based on Passive Optical Networks (PON)", ITUT-T Recommendation G.983.1 Erratum 1, Mar. 2006, 1 page.

Page 2, item (56), under Other Publications, Column 2, Lines 62-66 should read:
"Series G: Transmission Systems and Media, Digital Systems and Networks, Digital Sections and Digital Line System -- Optical Line Systems for Local and Access Networks, A Broadband Optical Access System with Increased Service Capability by Wavelength Allocation", ITU-T Recommendation G.983.3, Mar. 2001, 59 pages.

Page 4, item (56), under Other Publications, Column 1, Lines 21-22 should read:
Machine Translation and Abstract of Chinese Publication No. CN102549952, Jul. 4, 2012, 11 pages.

Signed and Sealed this  
Fifth Day of June, 2018

Andrei Iancu  
*Director of the United States Patent and Trademark Office*